O. CARMAN.
OUTLET BOX.
APPLICATION FILED SEPT. 28, 1908.

1,045,256.

Patented Nov. 26, 1912.

Witnesses:
Earl G. Klock.
J. Ellis Glen

Inventor:
Oscar Carman,
by
Att'y.

UNITED STATES PATENT OFFICE.

OSCAR CARMAN, OF INDIANAPOLIS, INDIANA, ASSIGNOR TO GENERAL ELECTRIC COMPANY, A CORPORATION OF NEW YORK.

OUTLET-BOX.

1,045,256.  Specification of Letters Patent.  Patented Nov. 26, 1912.

Application filed September 28, 1908. Serial No. 455,139.

*To all whom it may concern:*

Be it known that I, OSCAR CARMAN, a citizen of the United States, residing at Indianapolis, county of Marion, State of Indiana, have invented certain new and useful Improvements in Outlet-Boxes, of which the following is a specification.

This invention relates to boxes for containing circuit terminals in house wiring systems, and especially to such boxes as are shown in the patent to Goehst and Wilkes, No. 681,416. The box proper is furnished with a bushing which is adjustable up and down and has a flange to which the floor-plate is secured. The adjustability of the bushing enables the floor-plate to be brought flush with the floor or wall in which the box is set. In this patented device, however, the box must be placed exactly level, that is to say, with its axis perpendicular to the floor or wall, in order to bring the floor-plate into the plane of the floor. Inasmuch as it is often quite difficult to insure this accuracy of position, I have designed the present invention to meet the predicament.

The invention consists in an outlet box of the type referred to, having its floor-plate secured to the bushing by a ball joint of special construction, so that said plate can be adjusted not only longitudinally along the axis of the box but also obliquely thereto in any direction, and thus be brought flush with the floor or wall irrespective of the position of the box, within reasonable limits.

Figure 1:
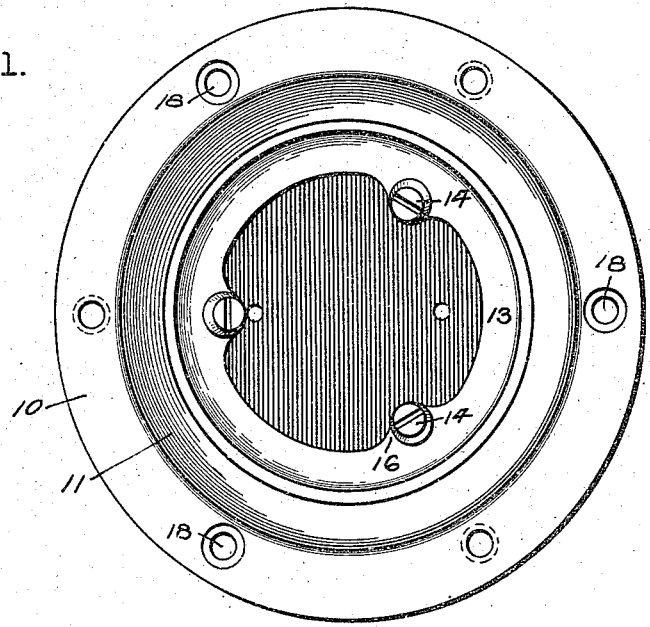
Figure 2:
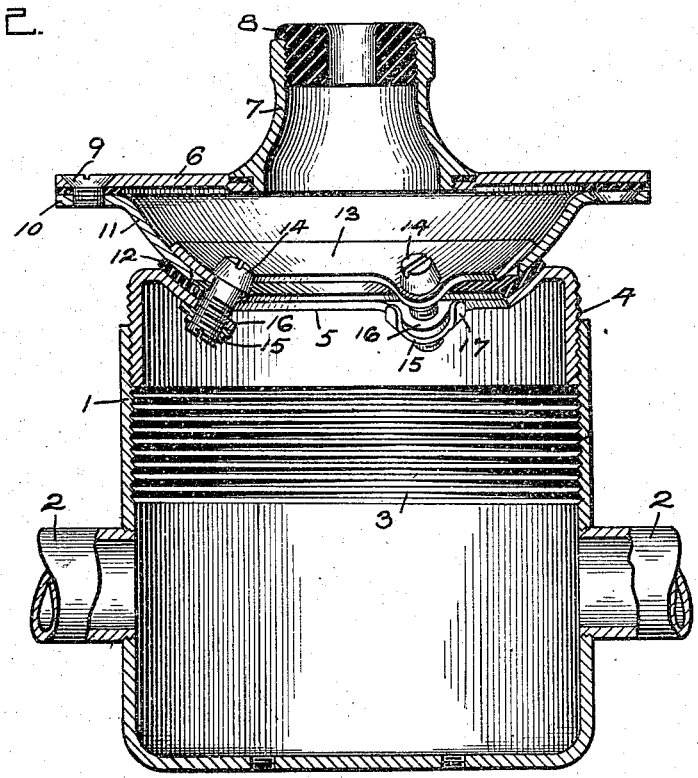

In the accompanying drawing, Figure 1 is a top plan view of my improved outlet box, with the floor-plate removed, and Fig. 2 is a longitudinal section of the entire box.

The body 1 is cylindrical and has suitable screw-threaded openings for the ends of conduits 2. Its upper portion has internal screw-threads 3 meshing with external screw-threads on the ring of bushing 4, so that the latter can be vertically adjusted by screwing it up or down. The bushing has an inward flange 5 at its upper end, said flange being preferably concave.

The floor-plate 6 has a central opening, screw-threaded to receive the lower end of the nozzle 7 which is provided with an insulating bushing 8. Instead of being attached directly to the flange of the bushing, as is the case in the patent to Goehst and Wilkes, the floor-plate is fastened by screws 9 to the horizontal flange 10 of an annular leveling-plate 11, which rests upon the flange 5 of the bushing, with a gasket 12 of rubber or leather between them. As the flange and the leveling-plate are segments of hemi-spheres, they form a ball joint which permits the floor-plate to be rocked in any direction so that it will be oblique to the axis of the box. The parts can be fastened in any position by means of a retaining ring 13 laid upon the leveling-plate and carrying clamping screws 14 which pass through holes in the flange 5 of the bushing into nuts 15 beneath said flange. The ring and the flange are preferably provided with inwardly extending lugs 16 to receive said screws; while the nuts are preferably provided with fingers 17 which are bent over the edge of the flange 5 to prevent said nuts from rotating. The ends of the screws are preferably slightly upset so that they cannot be entirely withdrawn, but only backed off sufficiently to loosen the leveling-plate for adjustment.

In operation, the floor-plate is detached to give access to the clamping screws during the process of adjusting the leveling-plate in the rabbet cut in the flooring; to which it is fastened by screws through the holes 18, after which the screws 14 are tightened up and the floor-plate replaced.

What I claim as new and desire to secure by Letters Patent of the United States, is,—

1. An outlet box having a concaved flange at its upper end, a convex leveling plate of sheet metal adapted to fit said flange and having a central aperture, a retaining ring adapted to fit said plate, and screws connecting said ring and flange and disposed within the periphery of the aperture of said plate.

2. An outlet box having a bushing screwed into its upper end, said bushing being provided with a hemi-spherically-curved flange, an annular leveling-plate having a similar curvature and resting on said flange, a retaining ring resting on said plate, clamping screws engaging said ring and flange, and a floor-plate attached to said leveling-plate.

In witness whereof, I have hereunto set my hand this 21st day of September, 1908.

OSCAR CARMAN.

Witnesses:
 JAMES T. COREY,
 I. B. HATFIELD.